A. ROSENSTEIN.
CHANGE SPEED GEARING.
APPLICATION FILED FEB. 7, 1911.
1,002,455.
Patented Sept. 5, 1911.
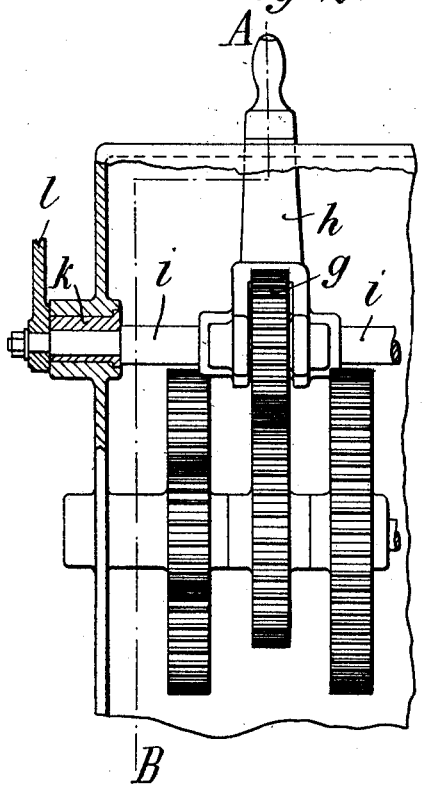
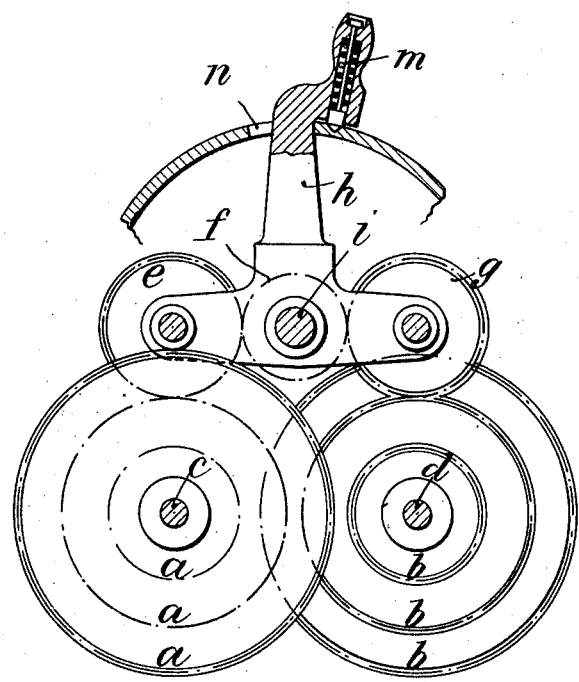
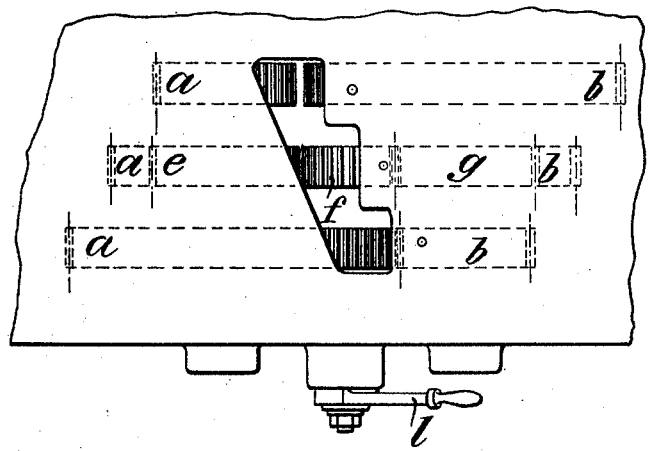

UNITED STATES PATENT OFFICE.

ADOLF ROSENSTEIN, OF NEISSE, GERMANY.

CHANGE-SPEED GEARING.

1,002,455.  Specification of Letters Patent.  Patented Sept. 5, 1911.

Application filed February 7, 1911. Serial No. 607,146.

*To all whom it may concern:*

Be it known that I, ADOLF ROSENSTEIN, subject of the German Emperor, residing at Neustädter street 8, Neisse, Germany, have invented certain new and useful Improvements in Change-Speed Gearing, of which the following is a specification.

The present invention relates to a change speed gearing in which the gear wheels for the various speeds fitted to the driving and the driven shaft respectively are indirectly engaged by one or several pairs of intermediate gear wheels which are slidable on a common third shaft eccentrically and rotatively journaled in the gear case. The distance of said shaft in its various operative positions from the shafts of the speed gears, to which it is parallel, is a constant one. The displacement of the intermediate gears may be obtained preferably by a member slidably mounted on said third shaft and carrying said intermediate gears. This member is so guided that the various operative positions of the intermediate gears relative to the said speed gears on the driving shaft and the driven shaft can be readily and promptly obtained.

In the accompanying drawing the present invention is exemplified.

Figure 1 is a side elevation of the new change speed gearing in part section; Fig. 2 is a sectional view along A—B in Fig. 1; Fig. 3 is a plan view.

The change speed gearing consists of two or more speed gears, $a$, $a$ and $b$, $b$ which are rigidly fitted to the driving shaft $c$ and the driven shaft $d$ respectively. These speed gears $a$, $a$ and $b$, $b$ are coupled by means of the intermediate gears $e$, $f$ and $g$. These intermediate gears are carried by a common member, as a lever $h$, and can be displaced on the shaft $i$ parallel to the running shafts $c$ and $d$. The shaft $i$ with the lever $h$ and the intermediate gears $e$, $f$, $g$, is journaled in eccentric bushings $k$ and can be rocked by means of a lever $l$, so that on the shaft $i$ being rocked, the intermediate gears can be disengaged from the speed gears and then be shifted from one set of speed gears to another. The operative position is obtained by rocking back the lever $l$, notches $n$ being provided in the gear case walls, into which lever $h$ will engage at the various operative positions. In this position a spring bolt $m$ will secure the lever $h$ against displacement during work. The spring bolt $m$ is so arranged, that it will be automatically released on the eccentric shaft $i$ being rocked. Therefore only two manipulations are required for obtaining another speed, which can be simultaneously performed.

The different speeds which can be obtained with the several gears may be marked in an easily visible manner at the notches for the lever $h$ and those for the spring bolt $m$.

It is obvious, that according to the gears employed variations of the speed may be obtained. The double set of gears may be arranged in a similar manner as graduated or cone transmission pulleys. With the hitherto used construction of tool machines having several pairs of gears arranged on different shafts the transmission of motion is effected by coupling said gears in series. The adjustment in such a case always requires several manipulations. With the present invention, however, the double set of gears can be adjusted by a single manipulation.

I claim:

1. A change speed gearing, comprising a gear case, a driving shaft, a driven shaft, a set of speed gears on the driving shaft, a corresponding set of speed gears on the driven shaft, a third shaft pivotally journaled in the gear case parallel to the aforenamed shafts, a member slidably mounted on the said third shaft and a set of intermediate gears engaging with each other, said intermediate gears being carried by the said member and adapted to couple the two sets of speed gears with each other upon rocking the said third shaft into operative position.

2. A change speed gearing, comprising a gear case, a driving shaft, a driven shaft, a set of speed gears on the driving shaft, a corresponding set of speed gears on the driven shaft, a third shaft pivotally journaled in the gear case parallel to the aforenamed shafts, a member slidably mounted on the said third shaft and a set of three intermediate gears engaging with each other, said intermediate gears being carried by the said member and adapted to couple the two sets of speed gears with each other upon rocking the said third shaft into operative position.

3. A change speed gearing, comprising a gear case, a driving shaft, a driven shaft, a set of speed gears on the driving shaft, a corresponding set of speed gears on the driven shaft, a third shaft journaled in the gear case parallel to the aforenamed shafts, eccentric bearings for said third shaft, a member slidably mounted on the said third shaft and a set of intermediate gears engaging with each other, said intermediate gears being carried by the said member and adapted to couple the two sets of speed gears with each other upon rocking the said third shaft into operative position.

4. A change speed gearing, comprising a gear case, a driving shaft, a driven shaft, a set of speed gears on the driving shaft, a corresponding set of speed gears on the driven shaft, a third shaft pivotally journaled in the gear case parallel to the aforenamed shafts, a member slidably mounted on the said third shaft, a set of intermediate gears engaging with each other, said intermediate gears being carried by the said member and adapted to couple the two sets of speed gears with each other upon rocking the said third shaft into operative position and locking means for securing the said member in operative position and adapted to be automatically released on rocking said member.

5. A change speed gearing, comprising a gear case, a driving shaft, a driven shaft, a set of speed gears on the driving shaft, a corresponding set of speed gears on the driven shaft, a third shaft eccentrically journaled in the gear case parallel to the aforenamed shafts, a member slidably mounted on the said third shaft and a set of intermediate gears engaging with each other, said intermediate gears being carried by the said member and adapted to couple the two sets of speed gears with each other upon rocking the said third shaft into operative position.

6. In a change speed gearing, the combination with two sets of speed gears, of an eccentrically borne rotary shaft, which in its operative position is at a constant distance from the axes of the said speed gears, and intermediate gears slidably mounted on the said shaft and adapted to couple the said two sets of speed gears.

7. In a change speed gearing, the combination with two sets of speed gears, of an eccentrically borne rotary shaft, which in its operative position is at a constant distance from the axes of the said speed gears, a member slidably mounted on said shaft and intermediate gears carried by said member and adapted to couple the said two sets of speed gears.

8. In a change speed gearing, the combination with two sets of speed gears, of an eccentrically borne rotary shaft which in its operative position is at a constant distance from the axes of the said speed gears, intermediate gears slidably mounted on the said shaft and adapted to couple the said two sets of speed gears, and means for locking the said intermediate gears in operative position.

9. In a change speed gearing, the combination with two sets of speed gears, of an eccentrically borne rotary shaft which in its operative position is at a constant distance from the axes of the said speed gears a member slidably mounted on the said shaft, intermediate gears carried by the said member and adapted to couple the said two sets of speed gears and means for locking the said member in its operative position.

In testimony whereof I affix my signature in presence of two witnesses.

ADOLF ROSENSTEIN.

Witnesses:
  WOLDEMAR HAUPT,
  HENRY HASPER.

---

Copies of this patent may be obtained for five cents each, by addressing the "Commissioner of Patents, Washington, D. C."